(12) United States Patent
Schepp et al.

(10) Patent No.: US 9,481,347 B2
(45) Date of Patent: Nov. 1, 2016

(54) INTERNAL GEAR PUMP FOR A HYDRAULIC VEHICLE BRAKE SYSTEM

(71) Applicant: Robert Bosch GmbH, Stuttgart (DE)

(72) Inventors: Rene Schepp, Waiblingen (DE); Edgar Kurz, Heilbronn-Horkheim (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/428,784

(22) PCT Filed: Jul. 29, 2013

(86) PCT No.: PCT/EP2013/065867
§ 371 (c)(1),
(2) Date: Mar. 17, 2015

(87) PCT Pub. No.: WO2014/048612
PCT Pub. Date: Apr. 3, 2014

(65) Prior Publication Data
US 2015/0274141 A1 Oct. 1, 2015

(30) Foreign Application Priority Data
Sep. 25, 2012 (DE) .................. 10 2012 217 225

(51) Int. Cl.
*F03C 2/00* (2006.01)
*F03C 4/00* (2006.01)
*F04C 2/00* (2006.01)
*B60T 8/42* (2006.01)
*F04C 2/10* (2006.01)
*F04C 15/00* (2006.01)
*F04C 2/08* (2006.01)
*F04C 13/00* (2006.01)

(52) U.S. Cl.
CPC ............ *B60T 8/4275* (2013.01); *F04C 2/084* (2013.01); *F04C 2/086* (2013.01); *F04C 2/10* (2013.01); *F04C 2/101* (2013.01); *F04C 2/102* (2013.01); *F04C 13/002* (2013.01); *F04C 15/0019* (2013.01); *F04C 15/0026* (2013.01)

(58) Field of Classification Search
CPC ........ F04C 2/101; F04C 2/102; F04C 2/084; F04C 2/086; F04C 15/0026; F04C 13/002
USPC .................... 418/71, 126–129, 170
See application file for complete search history.

(56) References Cited

FOREIGN PATENT DOCUMENTS

| DE | 196 13 833 A1 | 10/1997 |
|---|---|---|
| DE | 10 2009 047 643 A1 | 6/2011 |
| WO | 2012/103923 A1 | 8/2012 |

OTHER PUBLICATIONS

International Search Report corresponding to PCT Application Na PCT/EP2013/065867, mailed Apr. 4, 2014 (German and English language document) (5 pages).

*Primary Examiner* — Theresa Trieu
(74) *Attorney, Agent, or Firm* — Maginot, Moore & Beck LLP

(57) ABSTRACT

The disclosure relates to an internal gear pump for a slip-controlled hydraulic vehicle brake system. According to the disclosure a separating piece of the internal gear pump is formed having an inner part and an outer part, which engages around the end of the inner part with allowance for tolerance. In this way, the inner part and the outer part are movably connected to one another in a radial direction, and can be installed in the internal gear pump as a pre-mounted assembly.

9 Claims, 1 Drawing Sheet

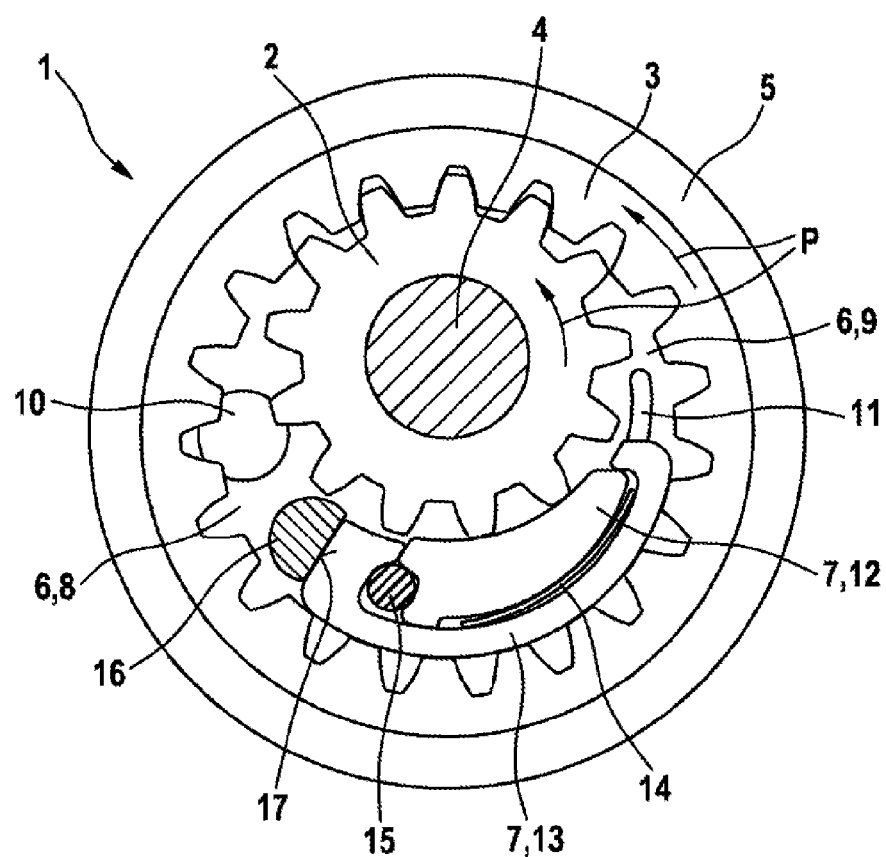

INTERNAL GEAR PUMP FOR A HYDRAULIC VEHICLE BRAKE SYSTEM

This application is a 35 U.S.C. §371 National Stage Application of PCT/EP2013/065867, filed on Jul. 29, 2013, which claims the benefit of priority to Serial No. DE 10 2012 217 225.4, filed on Sep. 25, 2012 in Germany, the disclosures of which are incorporated herein by reference in their entirety.

The disclosure relates to an internal gear pump. Internal gear pumps of this kind are used in slip-controlled and/or power-operated vehicle brake systems in place of piston pumps that are normally used, and are often referred to, though not entirely accurately, as return pumps.

BACKGROUND

Internal gear pumps are known. They have a pinion, that is to say an externally toothed gearwheel, which is arranged eccentrically in an internally toothed annulus and meshes at one point on the circumference or in a circumferential segment with the annulus. The pinion and the annulus can also be understood as gearwheels of the internal gear pump. By driving one of the two gearwheels in rotation, normally the pinion, the other gearwheel, that is to say normally the annulus, is also driven in rotation at the same time, and the internal gear pump delivers fluid in a manner known per se, delivering brake fluid in a hydraulic vehicle brake system.

Opposite the circumferential segment in which the pinion meshes with the annulus, the internal gear pump has a crescent-shaped free space between the pinion and the annulus, here referred to as a pump space. Arranged in the pump space is a divider, which divides the pump space into a suction zone and a discharge zone. Owing to its typical shape, the divider is also referred to as a crescent or crescent piece, and another name is filler piece. A typically convex inner side of the divider rests on tooth tips of teeth of the pinion, and a typically outwardly curved outer side of the divider rests on tooth tips of teeth of the annulus, with the result that the divider encloses fluid volumes in tooth gaps between the teeth of the gearwheels of the internal gear pump. Driving in rotation causes the gearwheels to pump the fluid in the tooth gaps from the suction side to the discharge side.

German Laid-Open Application DE 10 2009 047 643 A1 discloses an internal gear pump of this kind, the divider of which is of multipart construction and has an inner part, the inner side of which rests on the tooth tips of the teeth of the pinion, and an outer part, the outer side of which rests on the tooth tips of teeth of the annulus. The inner part and the outer part of the divider of the known internal gear pump are supported in a circumferential direction against a pressure in the discharge zone by a pin, which forms an abutment. The pin forming the abutment is arranged on the suction side of the divider and passes transversely or parallel to the axis through the pump space.

SUMMARY

The internal gear pump according to the disclosure has a multipart divider having an inner part, which rests on tooth tips of teeth of a pinion, and an outer part, which rests on tooth tips of teeth of an annulus. According to the disclosure, the inner part and the outer part of the divider are connected to one another movably in a radial direction Like the terms "circumferentially", "circumferential direction" and "axially" used below, "radially" relates to the internal gear pump and to an envisaged installation position of the parts. Mobility of the inner part and of the outer part in a direction other than in a radial direction is not excluded. The mobility of the inner part and of the outer part in a radial direction of the internal gear pump allows the envisaged contact of the inner part and the outer part with the tooth tips of the teeth of the gearwheels of the internal gear pump. The connection of the inner part to the outer part allows handling of the multipart divider as one component and simplifies assembly of the internal gear pump.

Advantageous embodiments and developments of the disclosure are found in the claims.

According to one embodiment, the inner part and the outer part engage one behind the other with play in a radial direction in order to provide the connection with mobility in a radial direction. The development according some embodiments envisages that the outer part reaches around the inner part or vice versa at circumferential ends. These embodiments of the disclosure allow simple connection of the inner part and of the outer part of the divider with mobility in a radial direction without additional components.

According to one embodiment, the inner part is supported on the outer part in a circumferential direction. This means that the inner part rests on the outer part, simplifying sealing between the inner part and the outer part. According to another particular embodiment, the pump includes the reverse situation, i.e. that the outer part is supported on the inner part in a circumferential direction. Preferably, just one of the two parts of the divider is supported directly on an abutment of the internal gear pump in a circumferential direction, while the other part is supported indirectly on the abutment via the first part.

According to yet another embodiment, the design of components of the divider comprises a subassembly that can be preassembled, which, after being preassembled, can be inserted like a single component into the pump space between the gearwheels of the internal gearwheels.

The internal gear pump according to the disclosure is provided, in particular, as a hydraulic pump for a hydraulic slip-controlled and/or power-operated vehicle brake system. In slip-controlled vehicle brake systems, hydraulic pumps are also referred to as return pumps and are nowadays predominantly embodied as piston pumps.

BRIEF DESCRIPTION OF THE DRAWING

The disclosure is explained in greater detail below by means of an embodiment illustrated in the drawing. The single FIGURE shows an internal gear pump according to the disclosure in an end view.

DETAILED DESCRIPTION

The internal gear pump 1 according to the disclosure illustrated in the drawing has an externally toothed gearwheel, referred to here as pinion 2, and an internally toothed gearwheel, referred to here as annulus 3. The pinion 2 is arranged parallel to the axis and eccentrically in the annulus 3 in such a way that the pinion 2 meshes with the annulus 3. The pinion 2 is fixed for conjoint rotation on a pump shaft 4, by means of which the pinion 2 and, via the pinion 2, the annulus 3 meshing therewith can be driven in rotation. A direction of rotation is indicated by arrows P. The annulus 3 is provided with rotary sliding support in a bearing ring 5.

Opposite a circumferential segment in which the pinion 2 meshes with the annulus 3, the internal gear pump 1 has a crescent-shaped free space, which is referred to here as pump space 6. Arranged in the pump space 6 is a multipart divider 7, which is likewise crescent- or semi-crescent-shaped and which divides the pump space 6 into a suction zone 8 and a discharge zone 9. The suction zone 8 communicates with a pump inlet 10, which is embodied as a bore and opens transversely, i.e. parallel to the axis, with respect to the internal gear pump 1 from one side into the suction zone 8 of the pump space 6. The discharge zone 9 communicates with a pump outlet 11, which is embodied in this embodiment as an arc-shaped slot and opens from one side into the discharge zone 9 of the pump space 6. The arc-shaped pump outlet 11 is partially overlapped by the divider 7 and extends by a certain amount beyond a discharge end of the divider 7 into the discharge zone 9 of the pump space 6 in a circumferential direction.

The multipart divider 7 has an arc-shaped inner part 12 and a likewise arc-shaped and stirrup-shaped outer part 13. A concave and cylindrical inner side of the inner part 12 rests on tooth tips of teeth of the pinion 2 and a convex cylindrical outer side of the outer part rests on tooth tips of teeth of the annulus 3. Through the contact with the tooth tips of the pinion 2 and of the annulus 3, the inner part 12 and the outer part 13 of the divider 7 enclose fluid in tooth gaps between the teeth of the pinion 2 and of the annulus 3, whereby fluid is pumped from the suction zone 8 to the discharge zone 9 when the pinion 2 and the annulus 3 are driven in rotation. In the case of the envisaged use of the internal gear pump 1 as a hydraulic pump of a hydraulic vehicle brake system, the fluid delivered is brake fluid.

At the circumferential ends, the outer part 13 reaches around the inner part 12 to such an extent that a rear engagement is formed which connects the inner part 12 to the outer part 13 with play in a radial direction. The inner part 12 connected by the rear engagement or surrounded at the ends by the outer part 13 are movable relative to one another in a radial direction.

Arranged in a gap between the inner part 12 and the outer part 13 is a leaf spring 14, which pushes the inner part 12 and the outer part 13 apart and, as envisaged, thereby pushes them into contact with the tooth tips of the teeth of the pinion 2 and of the annulus 3. In order to bring about a spring force, the leaf spring 14 can be flat, or can be curved with a different curvature to that of the inner part 12 and the outer part 13 or can be corrugated in the undeformed state. This list is not exhaustive.

At the end adjacent to the discharge zone, the gap between the inner part 12 and the outer part 13, in which the leaf spring 14 is arranged, communicates with the discharge zone 9, with the result that the same pressure prevails in the gap between the inner part 12 and the outer part 13 as in the discharge zone 9. This pressure likewise pushes the inner part 12 and the outer part 13 of the divider 7 apart and against the tooth tips of the teeth of the pinion 2 and of the annulus 3.

At the end adjacent to the suction zone, a sealing element 15 is arranged between the inner part 12 and the outer part 13 of the divider 7, forming a seal between the inner part 12 and the outer part 13 and axially at end or side walls (not shown) of a pump casing and/or at what are referred to as axial disks of the internal gear pump 1, which delimit the pump space 6 laterally. In the embodiment illustrated, the sealing element 15 is cylindrical in the undeformed state. Other shapes are possible for the sealing element.

The outer part 13 of the divider 7 is supported in a circumferential direction against the pressure prevailing in the discharge zone 9 on an abutment 16, which is arranged at an end of the divider 7 adjacent to the suction zone. In the embodiment illustrated, the abutment 16 is a cylindrical pin with a flat 17, on which the end of the outer part 13 of the divider 7 which is adjacent to the suction zone rests. The pin forming the abutment 16 passes through the pump space 6 of the internal gear pump 1 transversely, i.e. parallel to the axis, in the suction zone 6.

The inner part 12 of the divider 7 is not supported directly on the abutment 16 but indirectly via the outer part 13. An end of the inner part 12 adjacent to the suction zone rests on the end of the outer part 13 adjacent to the suction zone, which reaches around said end. The fact that the inner part 12 rests on the outer part 13 simplifies sealing between the inner part 12 and the outer part 13, for which purpose a simple seal, such as the cylindrical sealing element 15, is sufficient. An expensive, complex or multipart seal is not necessary.

As described, the ends of the outer part 13 which reach around the ends of the inner part 12 bring about a rear engagement with play, which connects the inner part 12 movably to the outer part 13 in a radial direction of the internal gear pump 1. The leaf spring 14 arranged between the inner part 12 and the outer part 13, which pushes the inner part 12 and the outer part 13 apart, causes friction which holds the inner part 12 axially or in a lateral direction in the outer part 13. The parts of the divider 7, namely the inner part 12, the outer part 13, the leaf spring 14 and the sealing element 15, form a subassembly which can be preassembled outside the internal gear pump 1. During the assembly of the internal gear pump 1, the divider 7, which is designed as a subassembly, is inserted into the pump space 6 between the pinion 2 and the annulus 3 as a single component, for which purpose all that is required is to push the inner part 12 and the outer part 13 together radially, with the result that the spacing between them is no larger than the gap between the tooth tips of the teeth of the pinion 2 and of the annulus 3. As a result, the fitting of the divider 7 in the internal gear pump 1 is simple, this being a considerable advantage in the case of small components, as is the case with an internal gear pump 1 which is used as a hydraulic pump in a hydraulic vehicle brake system.

The internal gear pump 1 according to the disclosure is provided as a hydraulic pump in a hydraulic, slip-controlled and/or power-operated vehicle brake system (not shown), where it is used for slip control operations, such as antilock, traction control and/or vehicle dynamics control operations and/or in hydraulic power-operated vehicle brake systems to produce brake pressure. Such hydraulic pumps are also referred to, if not entirely accurately, as return pumps. The abbreviations ABS, ASR, FDR and ESP are customary for the slip control operations mentioned. Vehicle dynamics control operations are also referred to in common parlance as antiskid control operations.

The invention claimed is:

1. An internal gear pump for a hydraulic vehicle brake system, comprising:
   an internally toothed annulus;
   an externally toothed pinion eccentrically positioned in the annulus and configured to mesh with the annulus in a circumferential segment, wherein a crescent-shaped pump space is defined between the pinion and the annulus at a location opposite the circumferential segment in which the pinion meshes with the annulus; and
   a divider positioned in the pump space and configured to divide the pump space into a suction zone and a discharge zone,
   wherein the divider includes an inner part and an outer part;

wherein the inner part rests on tooth tips defined on teeth of the pinion, and the outer part rests on tooth tips defined on teeth of the annulus; and wherein one of the inner part and the outer part extends around a first circumferential end and a second circumferential end of the other of the inner part and the outer part so as to restrain circumferential movement of the other of the inner part and the outer part and enable movement of the inner part and the outer part relative to one another in a radial direction.

2. The internal gear pump as claimed in claim 1, wherein the inner part and the outer part engage each other and have play relative to each other in the radial direction.

3. The internal gear pump as claimed in claim 2, wherein the outer part extends around the first and second circumferential ends of the inner part.

4. The internal gear pump as claimed in claim 3, wherein the first and second circumferential ends of the inner part are supported on the outer part such that movement of the inner part in a circumferential direction is restrained by the outer part.

5. The internal gear pump as claimed in claim 2, wherein the inner part extends around the first and second circumferential ends of the outer part.

6. The internal gear pump as claimed in claim 5, wherein the first and second circumferential ends of the outer part are supported on the inner part such that movement of the outer part in a circumferential direction is restrained by the inner part.

7. The internal gear pump as claimed in claim 1, further comprising:

a leaf spring extending in a circumferential direction and being positioned between the inner part and the outer part, wherein the leaf spring pushes the inner part and the outer part apart so as to push the inner part and the outer part against the tooth tips of the teeth of the pinion and of the annulus, respectively.

8. The internal gear pump as claimed in claim 1, further comprising:

a sealing element positioned between the inner part and the outer part, the sealing element being configured to at least one of: rest sealingly on the inner part, rest sealingly on the outer part, and form an axial seal.

9. The internal gear pump as claimed in claim 1, wherein the inner part and the outer part are connected to one another so as to form a subassembly configured to be preassembled.

* * * * *